(12) United States Patent
Monnier

(10) Patent No.: US 9,309,818 B2
(45) Date of Patent: Apr. 12, 2016

(54) METHOD OF CONTROLLING OPERATION OF AN ENGINE THAT CAN USE A SINGLE-FUEL OF A MULTI-FUEL COMBUSTION MODE

(75) Inventor: Gaetan Monnier, Aigremont (FR)

(73) Assignee: IFP Energies nouvelles, Rueil Malmaison (FR)

( * ) Notice: Subject to any disclaimer, the term of this patent is extended or adjusted under 35 U.S.C. 154(b) by 718 days.

(21) Appl. No.: 12/109,380

(22) Filed: Apr. 25, 2008

(65) Prior Publication Data

US 2008/0271704 A1    Nov. 6, 2008

(30) Foreign Application Priority Data

Apr. 27, 2007  (FR) ..................... 07 03122

(51) Int. Cl.
*F02D 19/06* (2006.01)
*F02D 19/08* (2006.01)
*F02D 35/02* (2006.01)
*F02D 41/00* (2006.01)

(52) U.S. Cl.
CPC ........ *F02D 19/0631* (2013.01); *F02D 19/0636* (2013.01); *F02D 19/0642* (2013.01); *F02D 19/0655* (2013.01); *F02D 19/081* (2013.01); *F02D 35/023* (2013.01); *F02D 41/0025* (2013.01); *F02D 2200/025* (2013.01); *F02D 2200/0612* (2013.01); *Y02T 10/36* (2013.01)

(58) Field of Classification Search
USPC ................................. 123/304, 305
See application file for complete search history.

(56) References Cited

U.S. PATENT DOCUMENTS

| | | | |
|---|---|---|---|
| 4,905,649 A | | 3/1990 | Washino et al. |
| 5,450,829 A | | 9/1995 | Beck |
| 5,594,649 A | * | 1/1997 | Cook et al. ............ 701/29 |
| 5,975,050 A | | 11/1999 | Brown et al. |
| 7,287,492 B2 | * | 10/2007 | Leone et al. .......... 123/1 A |
| 2006/0118085 A1 | * | 6/2006 | Oda et al. ............ 123/406.3 |
| 2008/0271705 A1 | * | 11/2008 | Sims ................... 123/435 |

FOREIGN PATENT DOCUMENTS

| | | |
|---|---|---|
| DE | 38 33 123 A1 | 4/1989 |
| DE | 195 39 170 A1 | 4/1997 |
| FR | 2 817 913 A1 | 6/2002 |
| WO | WO 99/45252 | 9/1999 |
| WO | WO 99/45256 | 9/1999 |
| WO | WO 99/46495 | 9/1999 |
| WO | WO 2004/111416 A1 | 12/2004 |

OTHER PUBLICATIONS

Guibet et al; Fuel and Engines; 1999; vol. 1; pp. 56-63, 202-205 and 220-227.*
Owen et al; Automotive Fuels Reference Book; Society of Automotive Engineers; Second Edition; pp. 590-593.*
Serras-Pereira et al; Characteristics of Ethanol, Butonal, Iso-Octane and Gasoline Sprays and Combustion from a Multi-Hole Injector in a DISI Engine; 2008; vol. 1; pp. 894-909.*
Miyawaki et al; Evaluation of MTBE Gasoline by Japanese Passenger Cars; 1980.*
French Search Report, FR 0703122, Dec. 11, 2007.

* cited by examiner

*Primary Examiner* — Stephen K Cronin
*Assistant Examiner* — Anthony L Bacon
(74) *Attorney, Agent, or Firm* — Fitch, Even, Tabin and Flannery LLP

(57) ABSTRACT

The present invention relates to a method of controlling operation of an internal-combustion engine using a single-fuel or a multi-fuel combustion mode with at least one fuel type comprising a high octane number and a low energy density and at least another fuel type comprising a low octane number and a high energy density, a method wherein the energy required for the engine to operate in multi-fuel mode is provided by a combination of two fuel types.

According to the invention, for engine operation in multi-fuel mode, the method consists in:
  determining the set values of the overall energy density and of the overall octane number resulting from the combination of fuels,
  feeding into the combustion chamber said fuels with a proportion intended to reach the set values,
  evaluating the real values of the overall energy density and/or of the overall octane number of said fuels,
  in case of a difference between the set values and the real values, in compensating for this difference by varying the proportion of at least one of the fuels so as to obtain the set energy density and/or octane number.

11 Claims, No Drawings

METHOD OF CONTROLLING OPERATION OF AN ENGINE THAT CAN USE A SINGLE-FUEL OF A MULTI-FUEL COMBUSTION MODE

FIELD OF THE INVENTION

The present invention relates to a method of controlling operation of an engine using several fuels.

It more particularly relates to engines operating with a first combustion mode referred to as single-fuel mode, according to which a single fuel is used, generally for idle speed and low engine loads, or according to another combustion mode referred to as multi-fuel mode allowing to combine several fuels of different nature, for medium and high loads.

BACKGROUND OF THE INVENTION

Such an engine type is better described in U.S. Pat. No. 5,975,050 wherein the engine operates under single-fuel combustion conditions with a fuel generally in the liquid phase, of diesel type, injected directly into the combustion chamber of the engine (direct injection) or into a precombustion chamber (indirect injection), or under dual-fuel combustion conditions, wherein a gaseous fuel is associated with this liquid fuel. This mode allows to achieve two combustion modes in the same engine cycle, fuel self-ignition and combustion of the air/gas mixture through a flame front propagation initiated by self-ignition.

As it is known from the prior art, methods and devices allow to control the fuel distribution and the transition between the two operating modes of the engine. By way of example, U.S. Pat. Nos. 5,450,829 and 5,975,050 and international applications WO-99/45,256 and WO-99/46,495 describe such methods and devices.

A method of controlling an internal-combustion engine operating in single-fuel or dual-fuel mode is also known from French patent FR-2,817,913 filed by the applicant. With this method, during operation in single-fuel mode, the energy required for operation of the engine is provided either by indirect injection of a gaseous fuel or by direct injection of a liquid fuel, gasoline here. During operation in dual-fuel mode, a gasoline injection is carried out for a mixture in a specific form while being combined with a gaseous fuel injection.

However, the applicant has observed that the various fuels used, such as gasoline or natural gas mainly, have quite different physico-chemical characteristics. Thus, two of these characteristics, which are the octane number (antiknock power) and the volume energy density (energy that can be developed for a volume of air-fuel mixture at a given fuel/air ratio, pressure and temperature), have a great impact on the engine performances and efficiency.

These differences between the fuels used in a single engine lead to define the characteristics of the engine—such as its compression ratio, its valve timing (opening and closing of the intake and exhaust valves), or the definition of the supercharger in case of a supercharged engine—according to either one of the fuels that can be used or for an operating compromise with the various fuels used.

In all the aforementioned cases, the engine does not run under optimum conditions.

In fact, in the case of a supercharged spark-ignition engine that can operate with a single-fuel or a dual-fuel combustion mode, with a fuel such as natural gas and/or gasoline, the natural gas is injected in gaseous form into the intake pipes by means of its feed circuit (tanks, feed ramp and specific injection nozzles) and the gasoline is injected in liquid form either into the engine intake pipes (indirect injection) or directly into the combustion chamber (direct injection) by means of a second feed circuit suited to the characteristics thereof.

This engine type is perfectly known to the person skilled in the art, but the engine performances are limited by the characteristics of each fuel, i.e.: the energy density for natural gas or the octane number for gasoline.

In fact, in the case of natural gas, the octane number of the gasoline is very high (of the order of 120 to 130). This allows to improve the engine efficiency by disposing of the engine knock problem, i.e. self-ignition of the fuel mixture (or charge) that can lead to engine destruction, through an increase in the compression ratio or optimum adjustment of the combustion timing or fuel/air ratio limitation in order to control the exhaust temperature. On the other hand, this natural gas, which is injected in gaseous form and has a low energy density, of the order of 3.1 kJ/l (kilojoules per liter), leads to limit the engine performances through a volumetric efficiency loss that cannot be always compensated by supercharging.

The engine therefore has a good efficiency but limited performances, notably at low engine speeds.

Conversely, when the engine runs on gasoline, the octane number of the fuel is much lower (of the order of 91 to 98) but the energy density is high (above 3.4 kJ/l). This provides good energy filling of the combustion chamber but with a low use efficiency.

The engine therefore has a reduced performance linked with the limitation imposed by the engine knock, either in terms of usable volumetric compression ratio, or in terms of combustion timing through sub-ignition advance.

The engine performance is consequently limited by the most critical parameter of the fuel used: the energy density for natural gas or the octane number for gasoline.

The present invention aims to overcome the aforementioned drawbacks by means of a control method allowing to maximize exploitation of the strong points of each fuel.

SUMMARY OF THE INVENTION

The invention thus relates to a method of controlling operation of a spark-ignition internal-combustion engine comprising at least one combustion chamber and able to use a single-fuel or a multi-fuel combustion mode with at least one fuel type comprising a high octane number and a low energy density and at least another fuel type comprising a low octane number and a high energy density, a method wherein the energy required for the engine to operate in single-fuel mode is provided either by one or the other of said two fuel types and wherein the energy required for the engine to operate in multi-fuel mode is provided by a combination of the two fuel types, characterized in that, for engine operation in multi-fuel mode, the method consists in:
  determining the set values of the overall energy density and of the overall octane number resulting from the combination of fuels,
  feeding into the combustion chamber said fuels with a proportion intended to reach the set values,
  evaluating the real values of the overall energy density and/or of the overall octane number of said fuels,
  in case of a difference between the set values and the real values, in compensating for this difference by varying the proportion of at least one of the fuels so as to obtain the set energy density and/or octane number.

The method can consist in evaluating the real overall octane number from a signal of a vibration detector located in the engine.

The method can consist in evaluating the real overall energy density from a signal of a pressure detector in the combustion chamber.

The fuel with a high octane number and a low energy density can be selected from among natural gas, alcohols or ethers.

The fuel with a low octane number and a high energy density can be selected from among gasolines.

The method can consist in combining in multi-fuel mode at least one gasoline with natural gas, or at least one gasoline with at least one alcohol, or a mixture of at least one gasoline and at least one alcohol with natural gas.

The set values can be mapped according to the engine running parameters.

The method can consist in combining the two fuel types so as to obtain two fuel mixtures fed into the combustion chamber in order to obtain stratification between the two mixtures.

The method can consist in carrying out indirect injection of two fuel types so as to have two fuel mixtures.

The method according to the invention, as well as its other features and advantages, will be clear from reading the description hereafter.

DETAILED DESCRIPTION

This description relates to a spark-ignition internal-combustion engine comprising at least one combustion chamber and that can operate with a single-fuel or multi-fuel combustion mode.

Thus, cold start-up of this engine is facilitated by a single-fuel mode using a gaseous fuel such as natural gas, during some thermodynamic cycles. This thus allows to prevent problems inherent in liquid injection that materializes in an incomplete vaporization of the fuel and deposition thereof on the intake pipe walls.

For idle speed and low loads, considering that there is no limitation as regards the octane number or the energy density of the fuel used, any one of the fuels is used for the single-fuel operation mode.

For medium and high engine loads with a multi-fuel combustion mode, which, in the description given hereafter by way of example, is limited to the dual-fuel mode, the proportions between the two fuels are adjusted for each working point of the engine so as to take advantage of the properties of the fuels used.

Thus, for a combustion with a given fuel/air ratio and in the case of a combination of gasoline with natural gas, the proportion between the two fuels is adjusted so as to maximize the performance and/or the efficiency of the engine, as regards the overall octane number as well as the overall energy density of the combination of the two fuel mixtures (air+gasoline and air+natural gas).

Therefore, starting from operation with a very large proportion of natural gas on a full-load point of the engine, if the optimum ignition advance is reached without knock limitation, this means, on the one hand, that the possible octane number potential of the fuel is not entirely used and, on the other hand, that the volumetric efficiency and therefore the maximum performance is degraded by the presence of the gas that generates a low volume energy.

From this point, we introduce the operating mode with a dual-fuel combustion by introducing progressively a proportion of gasoline under iso operational richness conditions. The introduction of gasoline that substitutes for part of the natural gas has the effect of decreasing the overall octane number in the combustion chamber while leading to an increase in the overall energy density of the combination of the two fuel mixtures.

The consequence is an increase in the engine performance and efficiency, as long as the knock limit is not reached for an optimum ignition advance and therefore combustion timing.

It is thus possible to determine therefrom, for each working point of the engine, an optimum proportion for the fuels to be fed into the combustion chamber of the engine in order to obtain the set values of the overall octane number and of the overall energy density of the combination of the two fuel mixtures.

An engine calculator containing mappings with the optimum engine operating parameters over the entire range of possible use with the respective proportions of gas and of fuel to be fed into the combustion chamber of the engine is therefore provided. This calculator also contains mappings allowing to determine the injection timing in the engine cycle of the fuel(s) and/or the injection times and/or the ignition angles.

In order to be able to know at any time the real value of the overall octane number of the combination of the two fuel mixtures fed into the combustion chamber, the vibration detector (or knock detector) the engine is usually provided with is used. The signal of this detector is sent to the engine calculator that will allow to evaluate the real octane number of the combination of the two fuel mixtures fed into the combustion chamber of the engine.

In case of a difference between the set value of the octane number determined by the engine calculator and the real value evaluated by this engine calculator, the respective proportions of gas and of gasoline are changed so as to obtain the set values for the overall octane number.

Thus, by way of example, if the evaluated octane number is lower than that of the set value, the amount of natural gas introduced is increased in order to raise this octane number up to the set value.

Similarly, the real overall energy density of the combination of the two fuel mixtures fed into the combustion chamber can be evaluated by means of the signals received by the pressure detector and the temperature detector of the intake distributor or by direct measurement of the air flow associated with the engine speed detector. These signals are then processed by the engine calculator to evaluate the real value of this energy density.

If this value is lower than the set value, the amount of gasoline introduced is increased so as to raise this density up to the set value.

The applications can concern different fuel pairs having as their main characteristic a high energy density if the octane number of the fuel is low and conversely. Some possible examples are: gasoline and natural gas, gasoline and alcohol, such as ethanol or methanol, or a gasoline-alcohol mixture and natural gas.

Similarly, it is possible to use some ethers such as MTBE (methyl tertio butyl ether) or ETBE (ethyl tertio butyl ether) as the fuel with a high octane number and a low energy density.

The present invention is not limited to the examples described above and it encompasses any variants and equivalents.

Notably, in the case of a multi-intake valve engine, it is possible to introduce each fuel mixture through different intake pipes to obtain stratification of the overall octane number by favouring the low-octane mixture at the start of the combustion and the high-octane mixture at the end of the combustion so as to gain in knock resistance.

Similarly, the fuels concerned can be injected directly or indirectly into the combustion chamber.

Advantageously, indirect injection of the fuel with a high overall octane number and a low energy density, as well as indirect injection of the fuel with a low overall octane number and a high energy density, are preferably used.

The invention claimed is:

1. A method of controlling operation of a spark-ignition internal-combustion engine comprising at least one combustion chamber and able to use a single-fuel or a multi-fuel combustion mode with two fuel types comprising at least one fuel type comprising a high octane number and a low energy density and at least another fuel type comprising a low octane number lower than the high octane number of the at least one fuel and a high energy density higher than the low energy density of the at least one fuel, a method wherein the energy required for the engine to operate in single-fuel mode is provided either by the at least one fuel type or by the at least another fuel type and wherein the energy required for the engine to operate in multi-fuel mode is provided by a combination of the two fuels, characterized in that, for engine operation in multi-fuel mode, the method comprises the steps of:

determining the set values of the overall energy density and of the overall octane number resulting from the combination of the two fuels, feeding into the combustion chamber the two fuels with a proportion intended to reach the set values, evaluating the real values of the overall energy density and of the overall octane number of the two fuels, in case of a difference between the set values and the real values, in compensating for this difference by varying the proportion of at least one of the two fuels so as to obtain the set energy density and octane number.

2. An engine operation control method as claimed in claim 1, characterized in that it the step of evaluating the real values of at least one of the overall energy density and the overall octane number of the two fuels comprises evaluating the real overall octane number from a signal of a vibration detector located in the engine.

3. An engine operation control method as claimed in claim 1, characterized in that it the step of evaluating the real values of at least one of the overall energy density and the overall octane number of the two fuels comprises evaluating the real overall energy density from a signal of a pressure detector in the combustion chamber.

4. An engine operation control method as claimed in claim 1, characterized in that the fuel with a high octane number and a low energy density is selected from among natural gas, alcohols or ethers.

5. An engine operation control method as claimed in claim 1, characterized in that the fuel with a low octane number and a high energy density is selected from among gasolines.

6. An engine operation control method as claimed in claim 1, characterized in that it comprises combining, in multi-fuel mode, at least one gasoline with natural gas, or at least one gasoline with at least one alcohol, or a mixture of at least one gasoline and at least one alcohol with natural gas.

7. An engine operation control method as claimed in claim 1, characterized in that the set values are mapped according to the engine running parameters.

8. An engine operation control method as claimed in claim 1, characterized in that it comprises combining the two fuel types so as to obtain two fuel mixtures fed into the combustion chamber in order to obtain stratification between the two mixtures.

9. An engine operation control method as claimed in claim 1, characterized in that it comprises carrying out indirect injection of two fuel types so as to have two fuel mixtures.

10. An engine operation control method as claimed in claim 1, characterized in that the fuel with a high octane number and a low energy density comprises natural gas.

11. An engine operation control method as claimed in claim 1, characterized in that it the step of evaluating the real values of at least one of the overall energy density and the overall octane number of the two fuels comprises evaluating the real overall octane number from a signal of a vibration detector located in the engine and evaluating the real overall energy density from a signal of a pressure detector in the combustion chamber.

* * * * *